United States Patent Office 2,745,937
Patented May 15, 1956

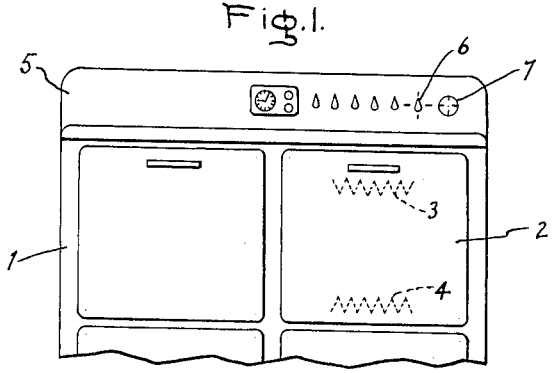
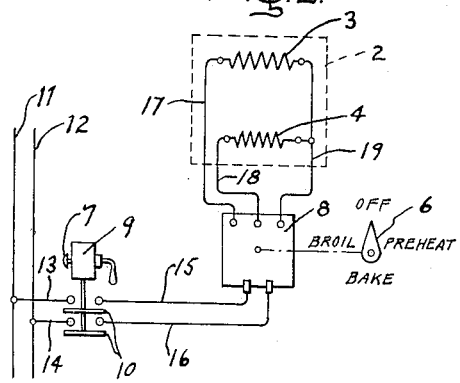
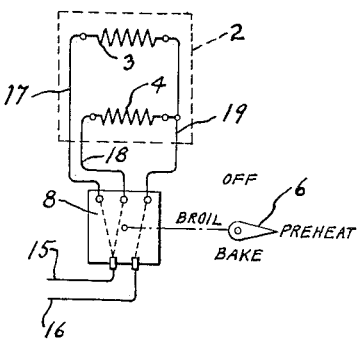
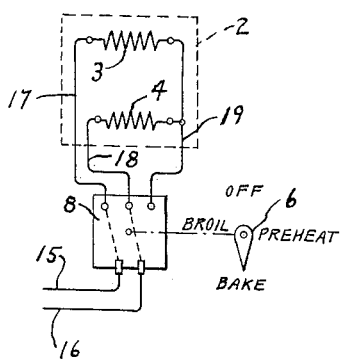
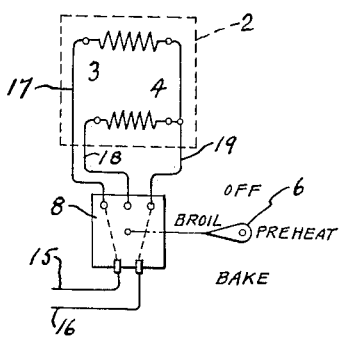
Inventor:
Stanley B. Welch,
by
His Attorney.

2,745,937

ELECTRIC OVEN HEATING SYSTEM

Stanley B. Welch, Louisville, Ky., assignor to General Electric Company, a corporation of New York Application August 24, 1953, Serial No. 376,122

6 Claims. (Cl. 219—20)

This invention relates to electric oven heating systems and more particularly to oven heating systems for domestic appliances such as electric ranges.

At the present time electric range ovens are commonly provided with a heating system which includes a lower heating unit, an upper heating unit comprising one or two resistance elements and an oven control device for energizing the heating units in various combinations and at various voltages so as to provide the proper heats for baking, broiling, and in some cases preheating operations. Although the primary function of the upper heating unit is to supply radiant heat for broiling, it has been found that improved baking results are obtained when this unit also supplies some heat to supplement the heat output of the lower unit during baking operations. However, during baking operations the heat output from the upper unit should be considerably less than the heat output of the lower unit and consequently a well-designed oven heating system must include an upper heating unit arranged to provide a high heat output for broiling and a reduced heat output for baking. In the past this has been accomplished either by providing an upper unit including two resistance elements, or by providing a single resistance element arranged to be energized at different line voltages for baking and broiling. While both arrangements have been incorporated in satisfactory oven heating systems, both have certain disadvantages such as requiring an additional resistance element or relatively complicated circuit arrangements for operating a single upper unit at different voltages.

Accordingly a primary object of the present invention is to provide an improved and simplified oven heating system having only two resistance heating elements.

Another object of my invention is to provide an oven heating system having two heating elements arranged to be energized so as to produce proper heats for preheating, baking, and broiling.

Another object of my invention is to provide an oven heating system having two elements so constructed and arranged that the proper heats for preheating, baking, and broiling may be obtained by connecting the elements either singly, in series, or in parallel to a two-wire source of power.

Another object of my invention is to provide an oven heating system including an upper heating element having a high temperature coefficient of resistance.

Further objects and advantages of my invention will become apparent as the following description proceeds and the features of novelty which characterize my invention will be pointed out with particularity in the claims annexed to and forming a part of this specification.

Briefly stated I achieved the foregoing objectives by providing an oven heating system in which the upper heating unit is a resistance element having a high positive temperature coefficient of resistance and a lower heating unit so constructed that its resistance does not change appreciably with temperature. When these units are connected in parallel to a power source both operate at maximum wattage for preheating the oven and when connected in series the wattage of the lower unit exceeds that of the upper unit by a substantial margin. Connections are also provided for connecting only the upper unit to the power source to provide full wattage from the upper unit for broiling operations.

For a better understanding of my invention reference may be made to the accompanying drawing in which Fig. 1 is a fragmentary front view of the upper portion of an electric range embodying the present invention.

Fig. 2 is a diagrammatic view of my invention showing the switch and circuit controls in the "off" position.

Fig. 3 is similar to Fig. 2 except that it shows the switch in the "preheat" position.

Fig. 4 is similar to Fig. 2 but shows the switch in the "bake" position.

Fig. 5 is similar to Fig. 2 but shows the switch in the "broil" position.

Referring now to Fig. 1 of the drawing the numeral 1 designates an electric range having an oven compartment 2 heated by upper heating element 3 and lower heating element 4. Mounted on backsplasher 5 are an oven control switch knob 6 and an oven thermostat knob 7; as shown in Fig. 2 control knob 6 is mechanically connected to an oven control switch 8 while thermostat knob 7 is mechanically connected to a thermostatic switch 9. Thermostatic switch 9 operates under the influence of a thermo responsive element (not shown) which is located within the oven and is thus responsive to oven temperatures. When the temperature in the oven rises above the dial setting the thermostatic switch operates to open the contacts 10 and interrupts the circuit to the oven. When the temperature of the oven drops below a desired point, the thermostatic switch closes the circuit.

Power for the heating elements 3 and 4 is supplied by supply lines 11 and 12 which may for example be connected to a 236 volt source of electrical energy. In order to carry the power to the oven I provide an oven heater circuit which includes wires 13 and 14 connecting thermostatic switch 9 to supply leads 11 and 12, and wires 15 and 16 connecting control switch 8 to thermostatic switch 9. To complete my oven circuit one terminal of heating element 3 is connected by wire 17 to a first terminal of switch 8, one terminal of heating unit 4 is connected by wire 18 to a second terminal of switch 8, and the other terminals of heating elements 3 and 4 are connected to a third terminal of the switch by means of wire 19.

Control switch 8, by means of which the oven circuit is manually controlled, is of the multiple-position multiple-pole type. For obvious reasons this control switch might consist of several separate units all moved simultaneously by a single handle or it might be a single switch as indicated in the drawing. One type of construction which may be adapted for use in the present combination is that shown in United States Patent No. 2,203,236 granted on June 4, 1940 to Charles P. Randolph et al. Also, it will be evident that single knob oven control devices which perform the functions of both circuit selecting and thermostatic control, such as a device of the type disclosed in United States Patent No. 2,403,824 granted July 9, 1946 to Heber L. Newell, may be utilized. I have illustrated a four-position switch with connections arranged so that all of the contacts are broken in one position (Fig. 2), heating elements 3 and 4 are connected in parallel in a second position (Fig. 3), heating elements 3 and 4 are connected in series in a third position (Fig. 4), and heating element 3 alone is connected to power supply wires 15 and 16 in a fourth position (Fig. 5).

In accordance with my invention upper heating element 3 has a high positive temperature coefficient of resistance so that its resistance is a function of its temperature and hence a function of the voltage applied across its terminals. Preferably the resistance material of heating element 3 has a temperature coefficient of resistance in the range between 0.0040 and 0.0052 per degree centigrade such as iron, tungsten, nickel, and certain alloys of these metals, for example. In the embodiment of my invention herein disclosed, heating element 3 has a temperature coefficient of 0.0045, being formed from a resistance material composed of 72% nickel and 28% iron; its electrical resistance varies from approximately 5.7 ohms at 500° F. to 14 ohms at 1650° F.

Lower heating element 4 differs from upper heating unit 3, being a conventional oven heating unit which has a substantially constant resistance throughout the temperature range in which it operates. For example, the resistance material of heating element 4 may be an alloy consisting of 80% nickel and 20% chromium, and may be of the sheathed type or the open coil type, both of which are well known in the art. This alloy has a temperature coefficient of 0.00013, which, it will be observed, is smaller than that of upper unit 3 by a ratio of about 35 to 1. Depending upon the resistance materials chosen for heating units 3 and 4, this factor may be as low as approximately 30 or as high as approximately 40 to 1.

In the embodiment of my invention herein disclosed lower heating element 4 has a resistance of approximately 14 ohms. Thus when the two units are connected in parallel for preheating the oven as shown in Fig. 3, both units are energized at 236 volts and upper element 3 has a heat generating capacity of approximately 4,000 watts and lower heating element 4 has a capacity of approximately 4,000 watts. Thus a total heating capacity of 8,000 watts is available for preheating operations. For baking, switch 8 is actuated so as to connect the two elements in series across 236 volt lines as shown in Fig. 4 and thus the current flowing in upper element 3 is substantially reduced. Hence, the heat generated by upper element 3 and its resistance decreases as does the voltage drop across its terminals. Under these conditions upper heating element 3 has a heat generating capacity of approximately 800 watts while lower heating unit 4 has a capacity of approximately 2,000 watts. Thus it will be observed that during baking operations the ratio of heat generated in the lower part of oven 2 to the heat generated in the upper part of the oven is approximately 2.5 to 1. For broiling operations only upper unit 3 is connected across the 236 volt lines as shown in Fig. 5 and the unit generates heat for broiling, the capacity of the unit being approximately 4,000 watts.

From the foregoing it will be seen that I have provided an improved oven heating system which requires only two heating units and relatively simple circuit connections for connecting the upper unit alone, both units in series, and if desired both units in parallel to a two-wire source of power. By means of these circuit connections my oven system provides ample heat output for preheating the oven, and the proper baking and broiling heats.

While I have shown and described a specific embodiment of my invention, I do not desire my invention to be limited to the particular construction shown and described, and I intend by the appended claims to cover all modifications within the true spirit and scope of my invention.

What I claim as new and desire to secure by Letters Patent of the United States is:

1. In an electric range, an oven compartment, heating means for said compartment comprising a first heating unit in the upper part of said compartment arranged to provide radiant heat for broiling operations and a second heating unit associated with said compartment so as to provide heat for baking operations, said first unit including a resistance heating element having a high positive temperature coefficient of resistance exceeding that of said second unit by a ratio of at least 30 to 1, a pair of electrical conductors arranged to supply electrical power to said range, and switching means for connecting said units to said conductors; said switching means including means for connecting said units in parallel circuit relation to provide maximum heat output from both units for preheating said oven, means for connecting said units in series circuit relation to provide a substantially reduced heat output from said first unit and a relatively high heat output from said second unit for baking operations, and means for connecting only said first unit to said conductors to provide radiant heat for broiling operations.

2. An electrical heating system for an oven comprising a source of electrical energy, an upper oven heating unit primarily for broiling operations having a high positive temperature coefficient of resistance, a lower oven heating unit primarily for baking operations having a temperature coefficient smaller than that of said upper unit by a factor of at least 30 to 1, an oven control switch including a control knob with means for indicating preheat, bake, and broil positions, said switch including means for connecting said upper and lower units in parallel to said energy source when said knob is moved to the preheat position, means for connecting said upper and lower units in series to said energy source when said knob is in the bake position, and means for connecting only said upper unit to said energy source when said knob is moved to the broil position; and a thermostat responsive to oven temperature connected in circuit with said switch for regulating oven temperatures.

3. An electrical heating system for an oven comprising a source of electrical energy, an upper oven heating unit primarily for broiling operations, said upper unit including a resistance element having a high positive temperature coefficient of resistance, a lower oven heating unit primarily for baking operations having a temperature coefficient smaller than that of said upper unit by a factor of at least 30 to 1, and switching means for connecting said units to said energy source; said means including means for connecting said units in series circuit relation for baking operations and means for energizing only said upper unit for broiling operations.

4. In an electric range, an oven compartment, heating means for said compartment comprising a first heating unit in the upper part of said compartment arranged to provide radiant heat for broiling operations and a second heating unit associated with said compartment so as to provide heat for baking operations, said first unit including a resistance heating element having a high positive temperature coefficient of resistance at least 30 times greater than that of said second heating unit, a pair of electrical conductors arranged to supply electrical power to said range, and switching means for connecting said units to said conductors; said switching means including means for connecting said units in series circuit relation to provide a substantially reduced heat output from said first unit and a relatively high heat output from said second unit for baking operations and means for connecting only said first unit to said conductors to provide radiant heat for broiling operations.

5. An electrical heating system for an oven comprising a source of electrical energy, an upper oven heating unit primarily for broiling operations having a high positive temperature coefficient of resistance, a lower oven heating unit primarily for baking operations having a temperature coefficient smaller than that of said upper unit by factor of at least 30 to 1, an oven control switch including a control knob with means for indicating bake and broil positions, said switch including means for connecting said upper and lower units in series to said energy source when said knob is in the bake position, and means for connecting only said upper unit to said energy source when said knob is moved to the broil position; and a thermostat responsive to oven temperature connected in circuit with said switch for regulating oven temperatures.

6. In an electric range, an oven compartment, heating means for said compartment comprising a first heating unit in the upper portion of compartment and a second heating unit associated with said compartment so as to heat the lower part thereof, said first unit including a resistance heating element having a high positive temperature coefficient of resistance greater than that of said second unit by a factor of the order of 35 to 1, and a power circuit for said units including a pair of conductors for supplying electrical energy thereto, a thermostat for interrupting the flow of current in said circuit in accordance with the temperature in said compartment, and switching means for connecting said units to said conductors; said switching means including means for connecting said units in parallel circuit relation to provide maximum heat output from both units for preheating said oven, and means for connecting said units in series circuit relation to provide a substantially reduced heat output from said first unit and a relatively high heat output from said second unit for baking operations.

References Cited in the file of this patent

UNITED STATES PATENTS

| | | |
|---|---|---|
| 1,121,979 | Collins | Dec. 22, 1914 |
| 2,078,675 | Lockwood | Apr. 27, 1937 |
| 2,218,778 | Weimer | Oct. 22, 1940 |
| 2,499,906 | Crise | Mar. 7, 1950 |
| 2,515,427 | Shulze | July 18, 1950 |
| 2,575,113 | Lennox | Nov. 13, 1951 |
| 2,605,380 | Bauman et al. | July 29, 1952 |